(12) United States Patent
Sumita et al.

(10) Patent No.: US 6,581,207 B1
(45) Date of Patent: Jun. 17, 2003

(54) INFORMATION FILTERING SYSTEM AND METHOD

(75) Inventors: Kazuo Sumita, Yokohama (JP); Miwako Doi, Kawasaki (JP); Osamu Hori, Yokohama (JP); Hideki Hirakawa, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/342,728

(22) Filed: Jun. 29, 1999

(30) Foreign Application Priority Data

Jun. 30, 1998 (JP) ............................................. 10-185191

(51) Int. Cl.[7] ...................... H04N 5/445; H04N 7/173; H04N 7/16; G06F 3/00; G06F 13/00

(52) U.S. Cl. ........................ 725/46; 725/119; 725/153; 725/141; 386/46; 358/908; 348/907

(58) Field of Search ............................. 725/39, 46, 48, 725/51, 105, 114, 119, 137, 153, 133, 135, 141; 709/217–219; 345/704, 721, 841; 704/275; 386/1, 45, 46, 83, 125–126; 358/908; 348/907

(56) References Cited

U.S. PATENT DOCUMENTS

| 5,168,353 | A | * | 12/1992 | Walker et al. ............... 725/103 |
| 5,534,911 | A | * | 7/1996 | Levitan ........................ 725/46 |
| 5,623,613 | A | * | 4/1997 | Rowe et al. ................. 345/841 |
| 5,657,072 | A | * | 8/1997 | Aristides et al. .............. 725/46 |
| 5,774,859 | A | * | 6/1998 | Houser et al. .............. 704/275 |
| 6,020,883 | A | * | 2/2000 | Herz et al. ................... 345/721 |
| 6,052,714 | A | * | 4/2000 | Miike et al. ................. 709/217 |
| 6,061,056 | A | * | 5/2000 | Menard et al. ............. 345/704 |

* cited by examiner

Primary Examiner—Andrew Faile
Assistant Examiner—Hai V. Tran
(74) Attorney, Agent, or Firm—Oblon, Spviak, McClelland, Maier & Neustadt, P.C.

(57) ABSTRACT

In an information filtering unit connected with user's video equipment by a communications line, a program content analyzing section analyzes the contents of broadcast programs from a broadcasting station in terms of substantial information such as video and sound. A collation evaluation section evaluates the similarity between the analyses and a user's profile stored in a profile storage section. A program selecting selection transmits the result of program selection to the video equipment in the form of time information. The video equipment receives and records a program from the broadcasting station in accordance with the time information sent from the information filtering unit.

22 Claims, 14 Drawing Sheets

⟨S⟩
 2:00
⟨T⟩
 INFORMATION! FRESH SALAD▽ANSWERING QUESTIONS
DISTURBING NEWS▽GUEST IN SEASON AND ENTHUSIASTIC
FAN▽EARLY READING OF EVENING PAPER  SHIBATA  NANASE
⟨S⟩
 3:55
⟨T⟩
 PROGRAM
⟨S⟩
 4:00
⟨T⟩
 BASEBALL EXHIBITION GAME CHIBA (LOTTE VS GIANTS)
ARITOH (CANCELED) OOKA ECHIZEN (RE)5:00 2
⟨S⟩
 5:55
⟨T⟩
 ×××NEWS▽SPORTS▽WEATHER INFORMATION
MATSUBARA  KADOWAKI  FUKUSHIMA
⟨S⟩
 7:00
  :

FIG. 5

⟨CHANNEL⟩   ⟨BROADCASTING TIME⟩   ⟨PROGRAM NAME⟩

10          4/20  14:00~15:55      INFORMATION, FRESH. SALAD
                                   QUESTION, ANSWER, NEWS,
                                   SEASON, ENTHUSIASTIC,
                                   FAN, EVENING PAPER, FAST
                                   READING, SHIBATA, NANASE
10          4/20  15:55~16:00      PROGRAM
10          4/20  16:00~17:55      BASEBALL, EXHIBITION GAME,
                                   CHIBA, LOTTE, GIANTS,
                                   ARITOH

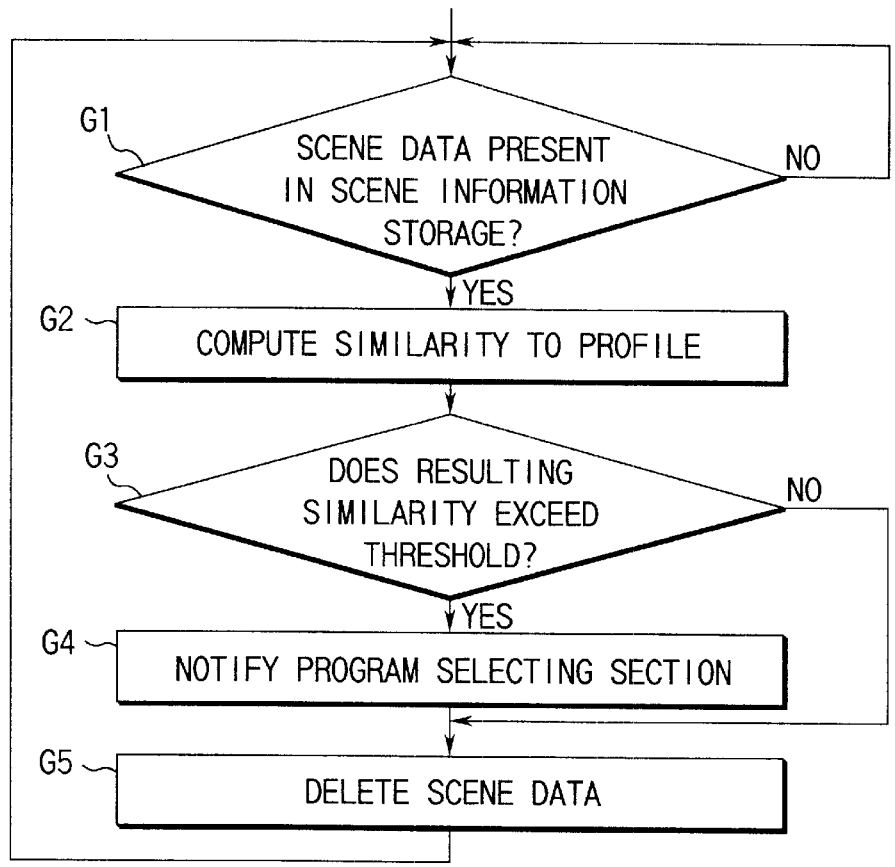

| CH | TITLE | TIME SLOT | |
|----|-------|-----------|--|
| 10 | BASEBALL [GIANTS VS YAKULT] | 4/21 | 14:00—15:55 |
| 10 | VARIETY SHOW | 4/22 | 19:00—19:55 |

INFORMATION FILTERING SYSTEM AND METHOD

BACKGROUND OF THE INVENTION

This application is based on Japanese Patent Application No. 10-185191, filed Jun. 30, 1999, the contents of which is incorporated herein by reference.

This invention relates to an information filtering system and method in which, on the server side, video, sound and text information in broadcast programs are analyzed for creating information for selection or summarization of a program and the resulting information is then transmitted to users on the client side.

In recent years, rapid progress has been made in digitization and cabling of television broadcasting. As a result, television broadcasting services in excess of 100 channels are being made available to users. However, such a large number of channels will make it difficult for users to decide which channel to watch, which may result in failure to watch a program of interest. In view of such problems, video equipment has been proposed which permits automatic recording of a program of interest to a user utilizing an electric program guide broadcast by a broadcasting station (Japanese Unexamined Patent Publication No. 7-135621). With this proposal, the video equipment includes means for extracting keywords from descriptions of the respective programs in the electric program guide, counts the frequencies at which the keywords appear in programs selected by the user, and records automatically a program containing a keyword having the highest frequency. The processing in this proposal can be implemented with relatively small computational power because of text (electric program guide)-based processing and keyword-based processing. However, program selection cannot be made on the basis of information, such as that is not provided by the electric program guide, namely, information that cannot be extracted unless the program contents, such as video or sound, are analyzed (for example, what topics are dealt with in programs). Processing based on program content is expected to allow for more accurate program selection.

However, analyzing video or sound involves considerable computational power. From the viewpoint of manufacturing cost, therefore, it is difficult to incorporate processing involving such computational power into home-use video equipment.

BRIEF SUMMARY OF THE INVENTION

It is an object of the present invention to provide an information filtering system, an information filtering unit, video equipment, and an information filtering method which, by causing a server type system to perform content processing, such as video analysis and sound processing, that involves computational power and to send information after analysis to users' video equipment, allows users to make use of content-based processing with no need of paying the computation-related cost.

According to a first aspect of the present invention, there is provided an information filtering system comprising an information filtering unit including receiving means for receiving programs broadcast by a broadcasting station; analyzing means for analyzing the contents of the programs received by the receiving means; selecting means for, by collating the analyses by the analyze means with a profile which has user's personal tastes for programs stored, selecting a program that matches the profile; and sending means for sending the results of selection by the selecting means to user's video equipment, and video equipment responsive to the results of selection sent from the sending means for automatically recording that program from the broadcasting station which is selected by the selecting means in the information filtering unit.

According to a second aspect of the present invention, there is provided an information filtering system comprising: an information filtering unit including receiving means for receiving programs broadcast by a broadcasting station; output means for outputting a summary of a program received by the receiving means and time information associated with the summary; rebroadcasting time detecting means for detecting a program rebroadcasting time from an electric program guide broadcast by the broadcasting station; and sending means for sending to video equipment the summary and associated time information output from the output means and the rebroadcasting time detected by the rebroadcasting time detecting means; and video equipment, responsive to the summary and associated time information and rebroadcasting time sent from the sending means, for displaying the summary.

According to a third aspect of the present invention, there is provided an information filtering method for use with an information filtering unit, connected with TV broadcast viewing video equipment by a communications line, for selecting a program from a number of programs, comprising the steps of: analyzing the contents of programs in terms of at least one of video, sound, and text and extracting their attributes; checking the extracted attributes against a profile having user's personal tastes for programs stored in advance to select a program that matches the user's profile; and sending the result of the program selection to the video equipment.

In the present invention, the information filtering unit carries out analysis processing, such as of analyzing the contents of a broadcast program in terms of video and sound, that requires computing power and then sends the resulting information to the video equipment on the client side.

The present invention allows private video equipment to utilize the results of advanced processing such as program selection, program recording indication, associating a program with another, etc., including program guidance provided by an electric program guide. Thus, users are allowed to receive sophisticated services through video equipment low in manufacturing cost.

In the present invention, the information filtering unit preferably instructs the video equipment to receive and record a program and to give indication to the user on the basis of an electric program guide that is broadcast beforehand and, when the program is actually broadcast, instructs the video equipment whether to continue or suspend the reception and recording of the program in accordance with the analyses of the program.

The present invention allows for rough filtering based on the electric program guide and more detailed filtering at the time of actual broadcasting.

In the present invention, it is desirable that the information filtering unit instructs the video equipment to receive and record a program and to give indication to the user on the basis of an electric program guide that is broadcast beforehand and, when the program is actually broadcast, instruct the video equipment whether to continue or suspend the reception and recording of the program in accordance with the analyses of the program.

In the present invention, for a program that was not selected at the time of rough filtering based on an electric program guide but was proved to should have been viewed as a result of detailed filtering performed at the time of actual broadcasting, it becomes possible to give the video equipment an instruction to receive and record it in the middle of broadcasting. In addition, it is also possible to give an instruction to provide for rebroadcasting.

Furthermore, in the present invention, the information filtering unit creates a summary of a broadcast program in the form of time information about times when scenes within the program are broadcast and sends the summary to the video equipment, and the video equipment creates a summary of the program received independently of the information filtering unit on the basis of the time information transmitted from the information filtering unit.

According to the present invention, as in a serial TV drama, in the case where one program is broadcast a number of times, one reception of the program can be allocated for the creation of a summary. In this case, the user is allowed, on viewing the summary, to determine whether or not to watch the rest of the program.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 shows an exemplary electric program guide broadcast by the broadcasting station shown in FIG. 1;

FIG. 11 shows an example of a profile stored in the profile storage section of FIG. 3;

FIG. 12 is a flowchart illustrating the process flow in the collation result evaluating section of FIG. 2;

FIG. 13 shows a format in which information is stored in the select result storage section of FIG. 2;

DETAILED DESCRIPTION OF THE INVENTION

A first embodiment of the present invention will be described first.

Figure 1:
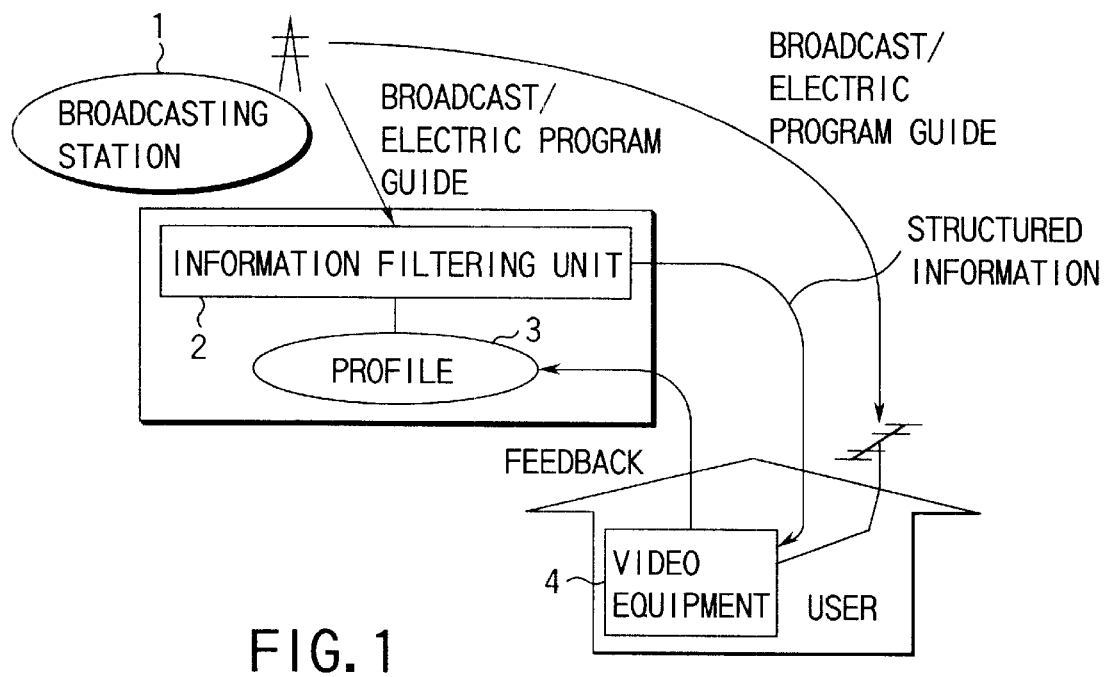
FIG. 1 shows a relationship among a broadcasting station system, an information filtering unit, and video equipment in an operating environment of a first embodiment of the present invention.

In FIG. 1, there is shown a relationship among a broadcasting station system, an information filtering unit, and video equipment, which create an operating environment of the first embodiment. Various programs and an electric program guide are broadcast from a broadcasting station 1. The information filtering unit 2 receives the programs and the electric program guide and, on the contents thereof, performs processes such as of making a search (for example, when a keyword is registered, searching for a scene associated with that keyword), making a selection, associating (for example, associating a keyword with a video portion that is associated with that key word), and structuring (for example, in the case of news, segmenting it into topics). The analyses by the information filtering unit 2 are delivered to the video equipment 4 on the user side. Upon receipt of the analyses thus delivered, the user's video equipment performs a function of recording automatically a broadcast directly received from the broadcasting station 1 or displaying a program summary to the user. In addition, the video equipment has a function of an information terminal for registering in the information filtering unit 2 information that what kind of program the user prefers. Further, the video equipment produces viewing information representing which programs the user viewed from operations he or she performed on the video equipment and sends it to the information filtering unit 2 as feedback information indicating user's personal tastes. The information filing unit 2 makes program selection on the basis of a profile 3 consisting of previously registered information concerning programs for which the user has his or her personal tastes and feedback information gathered through actual program viewing. The method of communications between the information filtering unit 2 and the video equipment 4 is not particularly limited. For example, communications over the Internet are allowed.

Figure 2:
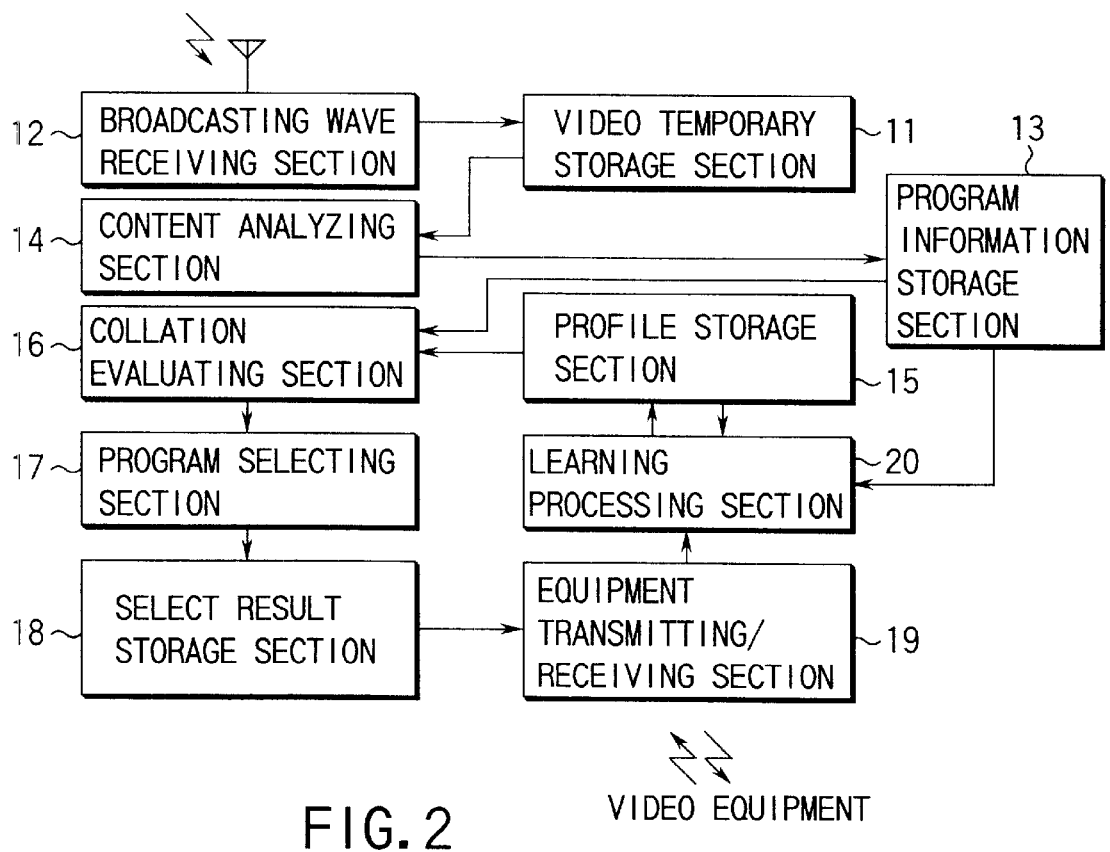
FIG. 2 shows a functional block diagram in the information filtering unit,of FIG. 1.

Hereinafter, the information filtering unit 2 will be described in detail. In FIG. 2 there is illustrated, in functional block diagram, an arrangement of the information filtering unit. As shown, the filtering unit 2 comprises a broadcasting wave receiving section 12 for receiving a broadcast and storing it into a video temporary storage section 11, a content analyzing section 14 for analyzing the contents of the program stored in the video temporary storage section 11 and storing the results into a program information storage section 13, a collation evaluating section 16 for collating the program information with profiles each of which is created for a respective one of users and stored in a profile storage section 15 and finding the degree of association with users' tastes, a program selecting section 17 for selecting programs on the basis of the results of evaluation, a select result storage section 18 for storing the results of selection in the form of time information for each user, an equipment transmitting/receiving section 19 for transmitting information stored in the storage section 18 to the video equipment 4 or receiving feedback information from the video equipment, and a learning processing section 20 for performing learning with the aid of feedback from the users and the analyses of the program contents stored in the program information storage section 13.

Figure 3:
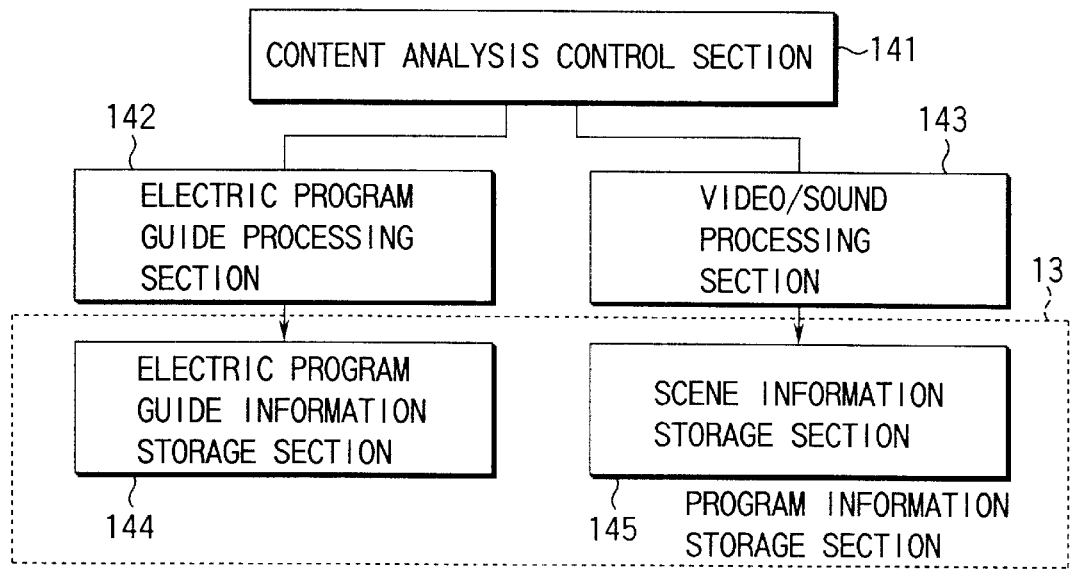
FIG. 3 shows an arrangement of the content analysis section of FIG. 2.

The arrangement of the content analyzing section 14 is shown in FIG. 3. As shown, the content analyzing section 14 comprises a content analysis control section 141 for exercising overall control of the content analysis, an electric program guide processing section 142 for performing processing on an electric program guide (extracting keywords corresponding to each program from the electric program guide and associating them with the time slots in which the corresponding programs are broadcast), a video sound processing section 143 for performing processing on video and sound (cutting scenes that make up a program from its video and sound information; the cutting is feasible with conventional techniques), extracting keywords contained in those scenes through speech recognition techniques (that is, recognizing spoken words by performers, converting them into text, and extracting keywords from the text), and associating the keywords with the time slots in which scenes are broadcast, an electric program guide information storage section 144 for storing information representing the association between the keywords and the broadcasting time slots obtained by the electric program guide processing section 142, and a scene information storage section 145 for storing the association between the keyword and the broadcasting time slot for each scene obtained by the video sound processing section 143. The content analyzing section 14, upon detecting the contents of programs (for example, news, dramas, etc.) from an electric program guide, is arranged to change the contents of processing accordingly. For example, in the case of news, no music processing is required. In the case of music programs, on the other hand, music processing is required naturally.

Figures 4A, 4B:
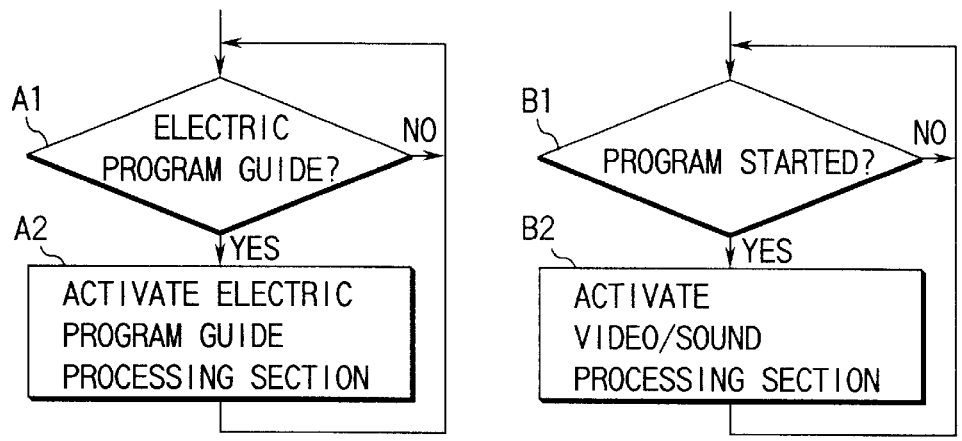
FIGS. 4A, 4B and 4C are flowcharts illustrating the process flow in the content analysis control section of FIG. 3.
Figure 4C:
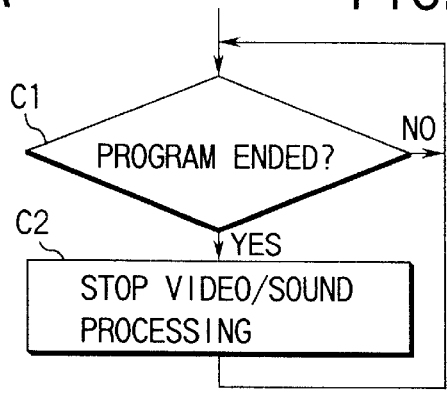

When an electric program guide runs during character broadcasting, the content analysis control section 141 activates the electric program guide processing section 142 (FIG. 4A). As for sound and video, the control section 141 activates the video/sound processing section 143 for each program with the broadcasting times of programs extracted by the electric program guide processing section 142 as program breaks (FIGS. 4B and 4C). That is, in step B1 in FIG. 4B, a decision of whether a program has started or not is made in a program break based on the program starting time registered on the electric program guide. Also, in step C1 of FIG. 4C, a decision of whether the program has ended or not is made based on the ending time of the program.

The broadcast contents are assumed to be composed of video information, sound information, and character information. Separating these types of information has been already performed in commercially available TV receivers. The techniques installed in these receivers can be used. Thus, the separating method is omitted herein.

An electric program guide is broadcast as a character broadcast from a broadcast station. The format of the electric program guide is standardized by ITU (International Telecommunication Unit). The electric program guide is required to be processed to conform to that format. For simplicity, the following description assumes that the electric program guide is broadcast in such a form as shown in FIG. 5. As shown in FIG. 5, the electric program guide is composed of program names and time slots. The program names contain information concerning subtitles and performers as strings of characters.

Figure 6:
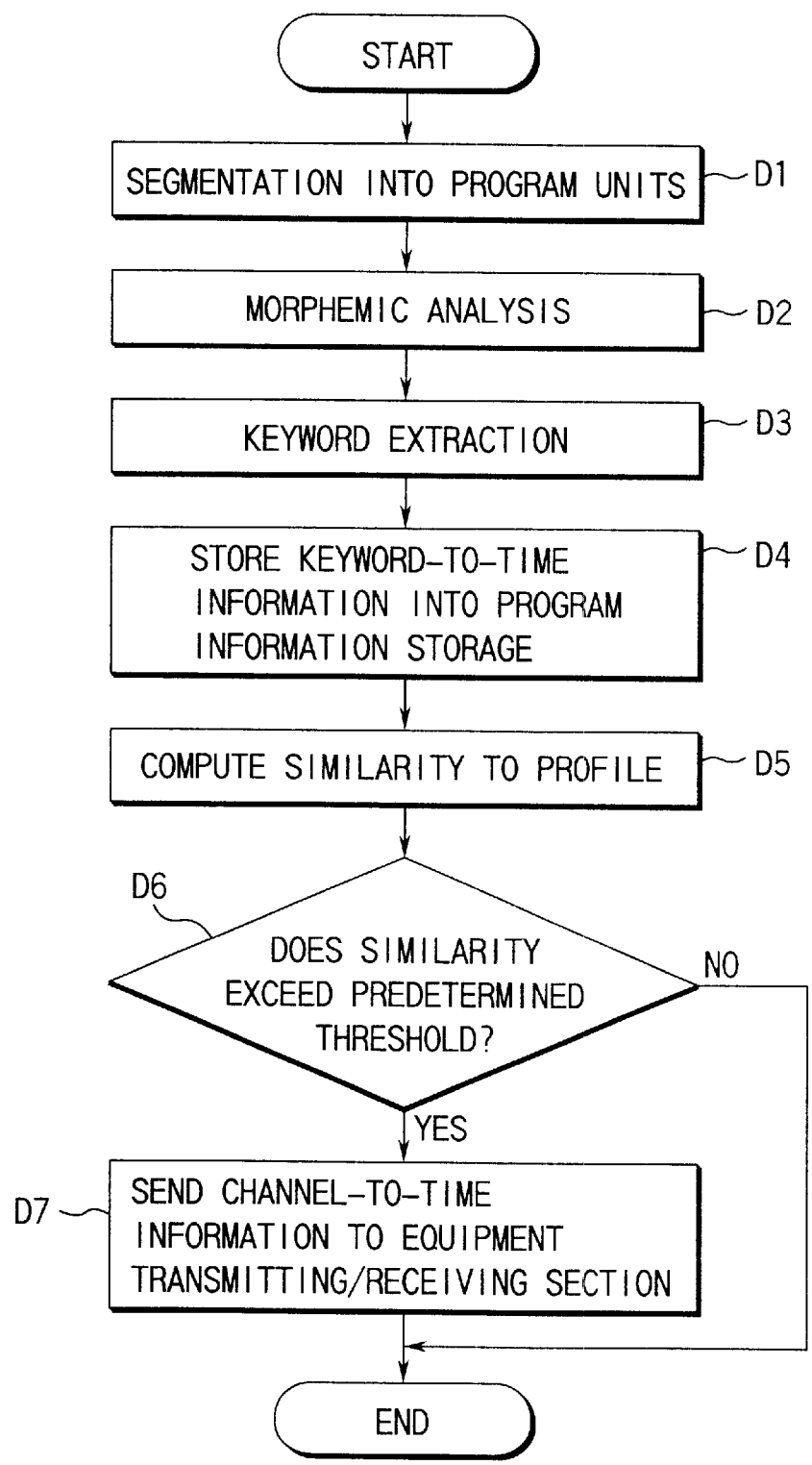
FIG. 6 is a flowchart illustrating the process flow in the electric program guide processing section of FIG. 3.
Figures 7, 8:
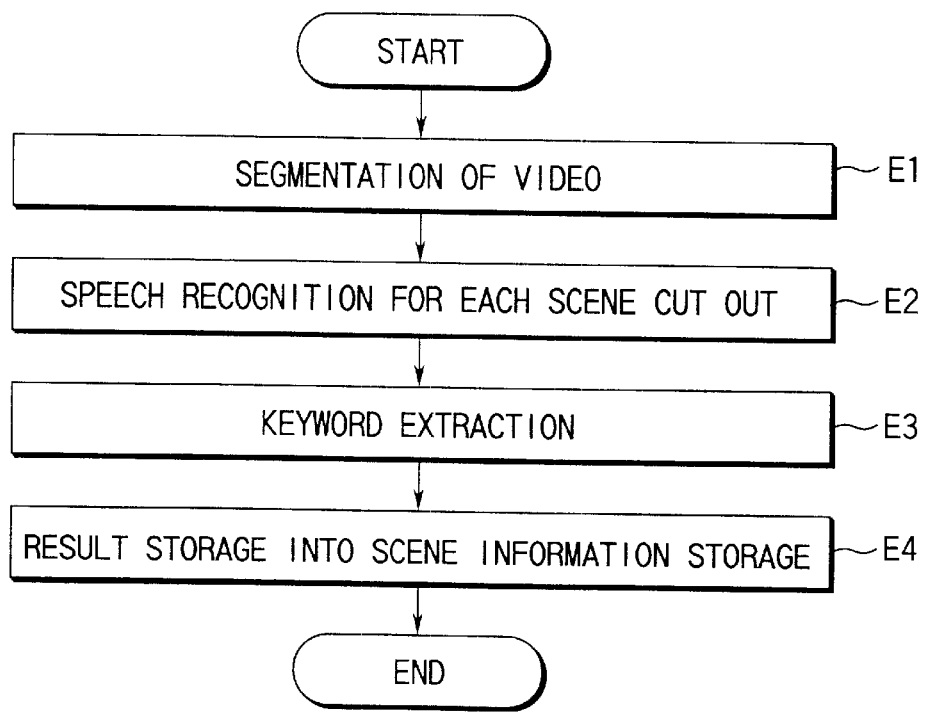
FIG. 7 shows an example of information representing the association between keywords and time slots stored in the electric program guide information storage section of FIG. 3.
FIG. 8 is a flowchart illustrating the process flow in the video sound processing section of FIG. 3.

FIG. 6 shows the process flow in the electric program guide processing section 142. The program information (e.g., program names, performers, time information, summary, etc.) is partitioned by a specific character code. The electric program guide processing section 142 detects this character code to retrieve information of each program (step D1). The section 142 makes a morphemic analysis of each program name and divides words (step D2). The morphemic analysis is a technique already known. For example, a technique can be used which has been implemented as an element part in Japanese-to-English machine translation. The electric program guide processing section 142 extracts keywords from words extracted by the morphemic analysis (step D3). The keyword extraction may be a straightforward process that allows nouns except indefinite words that mean a thing and so on (called stop words) to be taken as keywords. Alternatively, a technique as described in "Automatic Keyword Extraction and Significance Evaluation" by Haruo Kimoto . . . , NL64-1, pp. 1–8 (1987) can be used. The electric program guide processing section 142 stores information representing the association between keywords and time slots in the electric program guide information storage section 144 (step D4). FIG. 7 shows an example of such information. As shown in FIG. 7, the information includes channel numbers, time slots for broadcasting, and keywords contained in program names.

The electric program guide processing section 142 computes the degree of similarity between the keywords stored in the electric program guide information storage section 144 and the profile stored in the profile storage section (step D5) and, if the resulting similarity exceeds a given threshold (YES in step D6), notifies the equipment transmitting/receiving section 19 of the corresponding channel and time slot information (step D7).

FIG. 8 shows the process flow in the video/sound processing section 143. The processing section 143 first retrieves scenes from a program (step E1). The section 143 next subjects speech information in each scene to speech recognition (step E2) and then extracts keywords from the results of the speech recognition (step E3). Finally, the section 143 stores the extracted keywords into the scene information storage section 145 (step E4).

The cut detection (scene cutout) for segmentation of video is to subject a program to division by content by detecting successive scenes. This can be implemented by an existing technique as proposed in "Moving Picture Cut Detection" by Otsuji, Sotomura, and Ohba, Technical Report of IEICE (the Institute of Electronics Information and Communication Engineers), IE90-103 (1991).

The speech recognition for each scene in a program can be implemented by an existing technique as described in "Noise Immunity Learning in Speech Recognition by Word Spotting" by Youich Takemura et al., Technical Report of IEICE, J74-D-II, 2, pp. 121–129 (1991). Depending on whether the speech recognition is performed by phoneme or word, the following keyword processing varies. Here, the speech recognition is assumed to be performed by word.

Figures 9, 10:
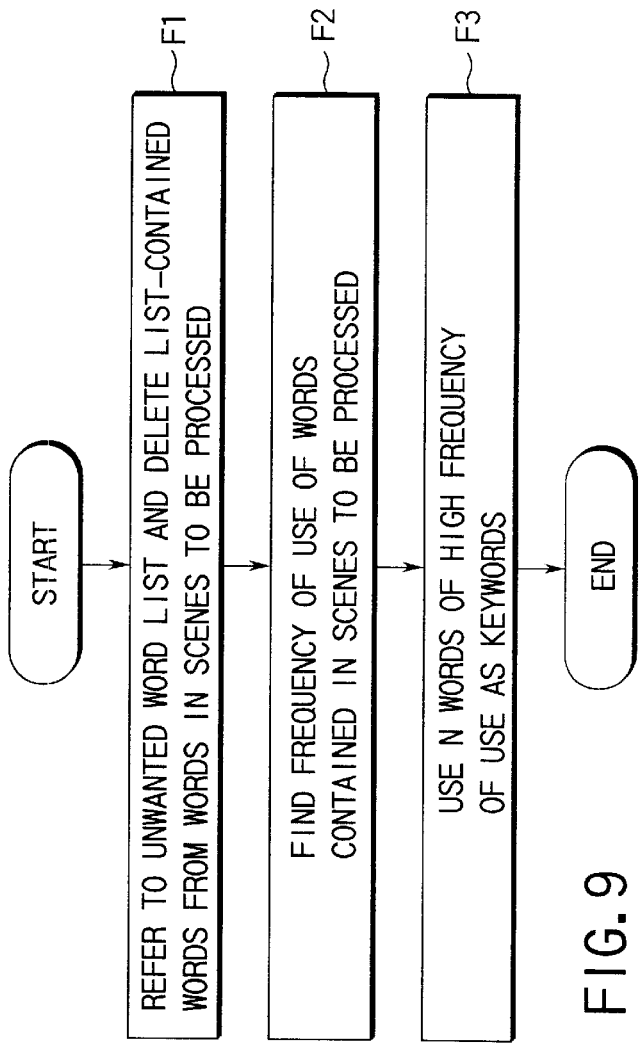
FIG. 9 is a flowchart illustrating the process flow of keyword extraction in the first embodiment.
FIG. 10 shows information stored in the scene information storage section of FIG. 3.

The speech recognition allows spoken words to be retrieved from the cut scenes. The method for word-based keyword extraction can be implemented by a process similar to that usually performed on text. In FIG. 9 there is shown an example of process flow for keyword extraction. A list of unwanted words (not shown) stores words that are not appropriate for keywords (thing, following, foregoing, and so on). In this procedure, words contained in the unwanted word list are first excluded (step F1) and then words that are high in frequency of use are selected as keywords (steps F2 and F3). A measure used in keyword extraction the object of which is text is tf·idf. it is also possible to determine keywords using such a measure. Here, tf is a value for the frequency of use of a candidate word for keyword in an object scene, while idf represents a value for the reciprocal of the number of scenes that contain,the candidate word (within an object program). The use of such a measure allows not a word that is frequently used throughout the program but a word that is particularly used frequently in the scenes to be selected as a keyword.

The keywords extracted by the electric program guide processing section 142 and the video/sound processing section 143 are stored collectively into the program information storage section 13 for subsequent use by the learning processing section 20.

FIG. 10 shows an example of information stored in the scene information storage section 145. The information comprises channel number information, program time slot information, scene time slot information, and keywords for each scene (a set of information items is referred to as scene data). The scene information storage section 145 functions as a first-in first-out queue. When scene data is stored, the collation evaluating section 16 refers to it and then collates it with the profile of each user stored in the profile storage section 15. An example of a profile stored in the profile storage section is shown in FIG. 11.

Next, the process flow in the collation evaluating section 16 is shown in FIG. 12. The collation evaluating section 16 starts the processing when scene data is registered into the scene information storage section 145 (YES in step G1), computes the similarity between the keyword portion in the scene data and each profile registered into the profile storage section (step G2), and, when the resulting similarity exceeds a given threshold (YES in step G3), notifies the program selecting section 17 of that scene data as profile-related scene data (step G4). After the termination of these processes, the scene is deleted (step G5). The way to compute the similarity is not subject to any restriction. For example, the similarity can be computed by $$S=(Pi \cdot K)/|Pi| \, |K| \quad (1)$$

where Pi is the vector of the keyword in profile i (each element is weighted according to the frequency of use of the keyword) and K is the vector that uses the frequency of use of the keyword in object scene data as an element. Pi·K stands for the inner product and |K| stands for the square norm of the vector K.

As instructed by the,collation evaluating section 16, in order to instruct the video equipment of the user corresponding to the profile to continue recording of a program, the program, selecting section 17 stores the information into the select result storage section 18. The format of storage in the select result storage section 18 is shown in FIG. 13. As shown, the information comprises the user ID, the broadcasting time slot, and the time slot for each scene. The result of the program selection in the program selecting section 17 may be stored at the time when the similarity between the keywords and the profiles for each scene exceeded a fixed threshold or when scenes that exceed a fixed threshold appeared more than a predetermined number of times.

Figure 14A:
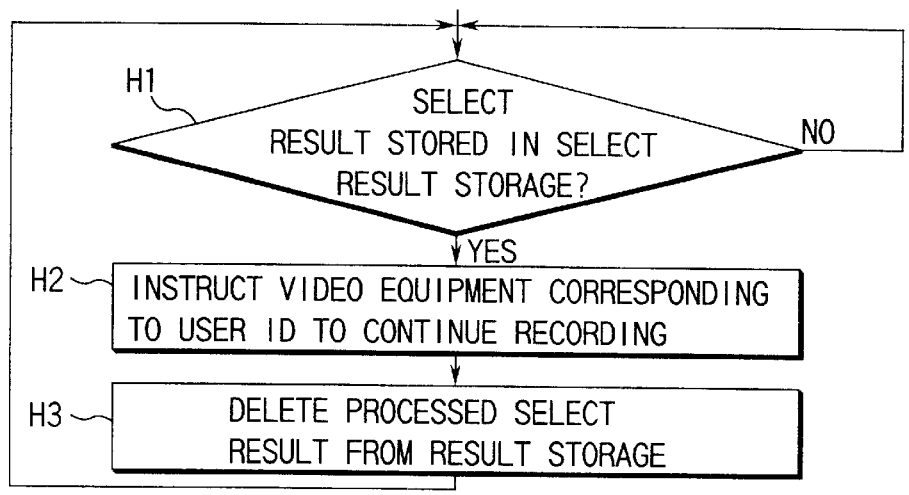
FIGS. 14A to 14C are flowcharts illustrating the process flow in the transmitting/receiving section of FIG. 2.
Figure 14B:
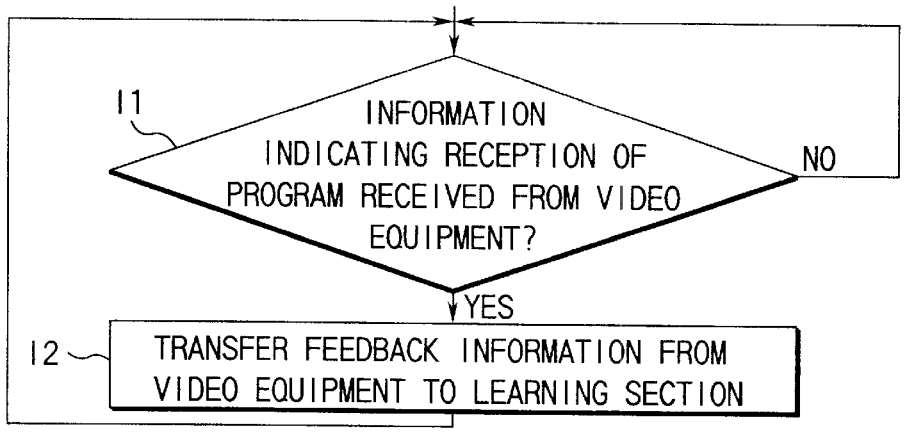
Figure 14C:
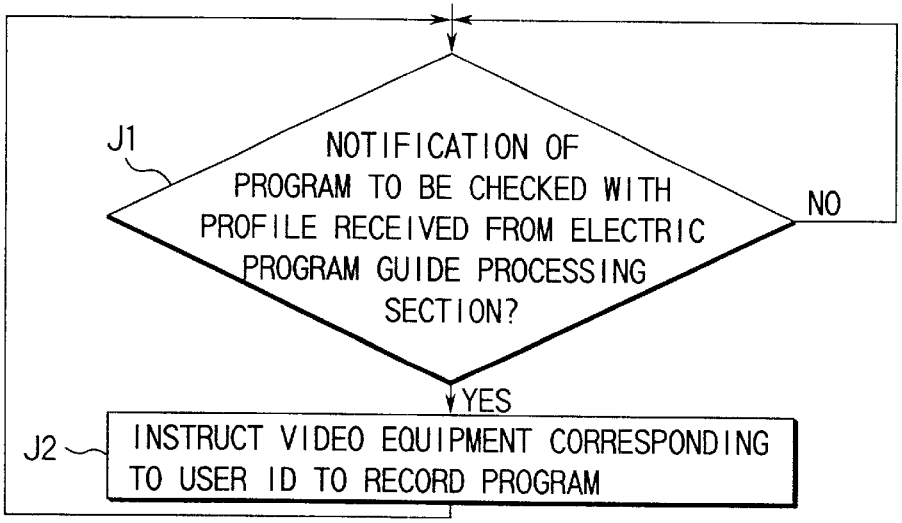

The process flow in the equipment transmitting/receiving section 19 is shown in FIGS. 14A to 14C. The processing by the transmitting/receiving section comprises a transmission process of transmitting an instruction to continue the recording on the basis of the result of selection (FIG. 14A), a reception process of receiving feedback information from the video equipment (FIG. 14B), and a process. of instructing pre-recording based on an electric program guide (FIG. 14C).

Figure 15:
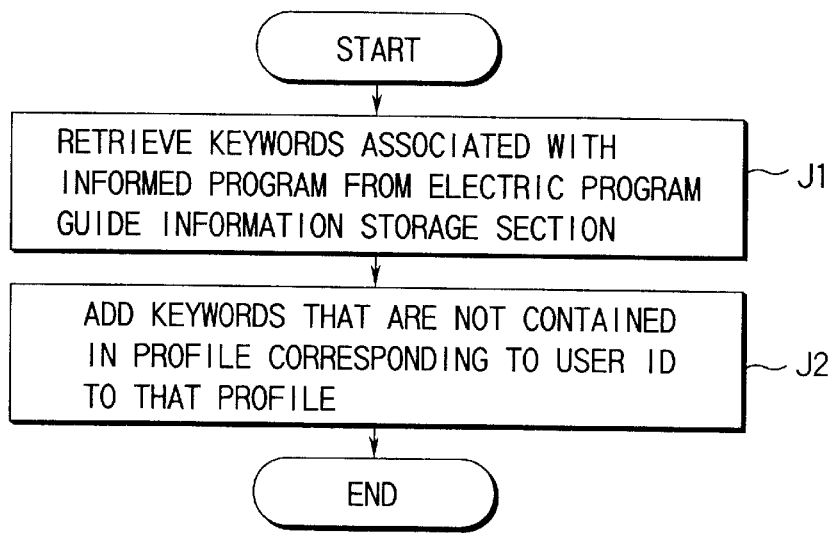
FIG. 15 is a flowchart for the process flow in the learning processing section of FIG. 2.

The process flow in the learning processing section 20 is shown in FIG. 15. This learning process is simple and involves retrieving a keyword corresponding to a user-selected program from the program information storage section 13 in accordance with the result of program selection by the user from the video equipment 4 (step J1) and adding that keyword to the keywords in the user's profile (step J2). Let the keyword vector for the selected program be Kf and the keyword vector in the original profile be K. Then, the keyword vector K' in the most recent profile can be obtained by $$K'=\alpha K+\beta Kf \quad (2)$$

where α and β are coefficients to control the level of learning.

Incidentally, the information filtering unit 2 and the video equipment 4 receive a broadcast at the same time from the broadcasting station 1. The information filtering unit 2 needs a processing time to detect whether the program is of interest to the user. When the video equipment 4 is instructed to record the program for the user, the program has begun already. Therefore, the video equipment 4 cannot record the program on a timely basis. For this reason, the following accommodations are made in the information filtering unit 2 in the first embodiment.

That is, the information filtering unit 2 carries out rough filtering on the basis of an electric program guide and instructs the video equipment 4 to record a relatively wide range of programs. After the start of broadcasting, the information filtering unit 2 sends to the video equipment 4 an instruction to continue recording of programs that are likely to be of interest to the user. Thus, the video equipment 4 is allowed to erase programs for which the instruction to continue recording is not given. Conversely, for programs out of the rough filtering, it would be effective to instruct the video equipment 4 to start recording or send some information.

Figure 16:
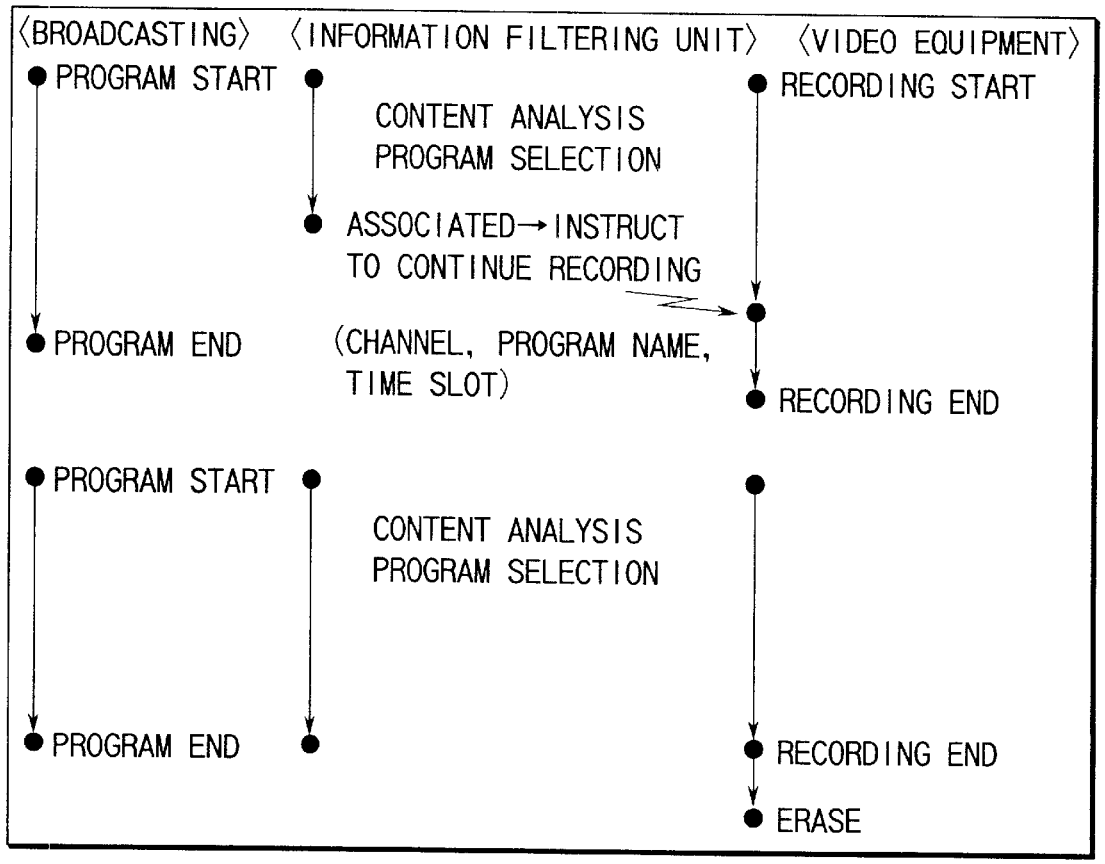
FIG. 16 shows a protocol between the information filtering unit and the video equipment and the operation of the video equipment in the first embodiment.

In FIG. 16 there is illustrated the protocol between the information filtering unit 2 and the video equipment 4 and the time chart of the operation of the video equipment 4. As shown in the upper half of FIG. 16, for a program that is associated with the profile, the video equipment 4 is notified of an instruction to continue recording. Upon receipt of the instruction to continue recording from the information filtering unit 2, the video equipment 4 sets a flag to indicate that the continuation of recording is instructed, as will be described later. At this stage, it is also possible to erase programs for which no recording continuation instruction has been issued. However, since there is the possibility that the association with the profile may be found at close to the end of a program, the video equipment 4 is arranged not to erase programs for which no recording continuation instruction has been issued at that stage. As shown in the lower half of FIG. 16, on the other hand, the recording continuation instruction is not sent for programs that are not associated with the user. After the termination of recording, the video equipment 4 determines that programs for which the recording continuation instruction flag is not set, i.e., programs for which no instruction is given to continue recording, are ones that are allowed to be erased and then may erase those programs. In the first embodiment, the information filtering unit 2 is connected with the video equipment 4 by a communication line, such as a telephone line, and sends the information to the video equipment 4 over the line. Instead, it is also possible to send the information carried on a broadcasting wave together with the user ID.

Figure 17:
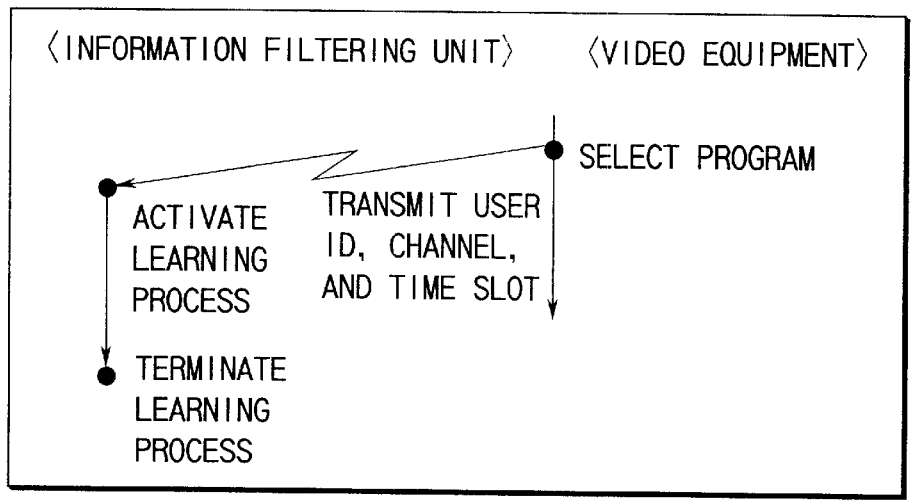
FIG. 17 shows a protocol between the video equipment and the information filtering unit for learning processing in the first embodiment.
Figure 18:
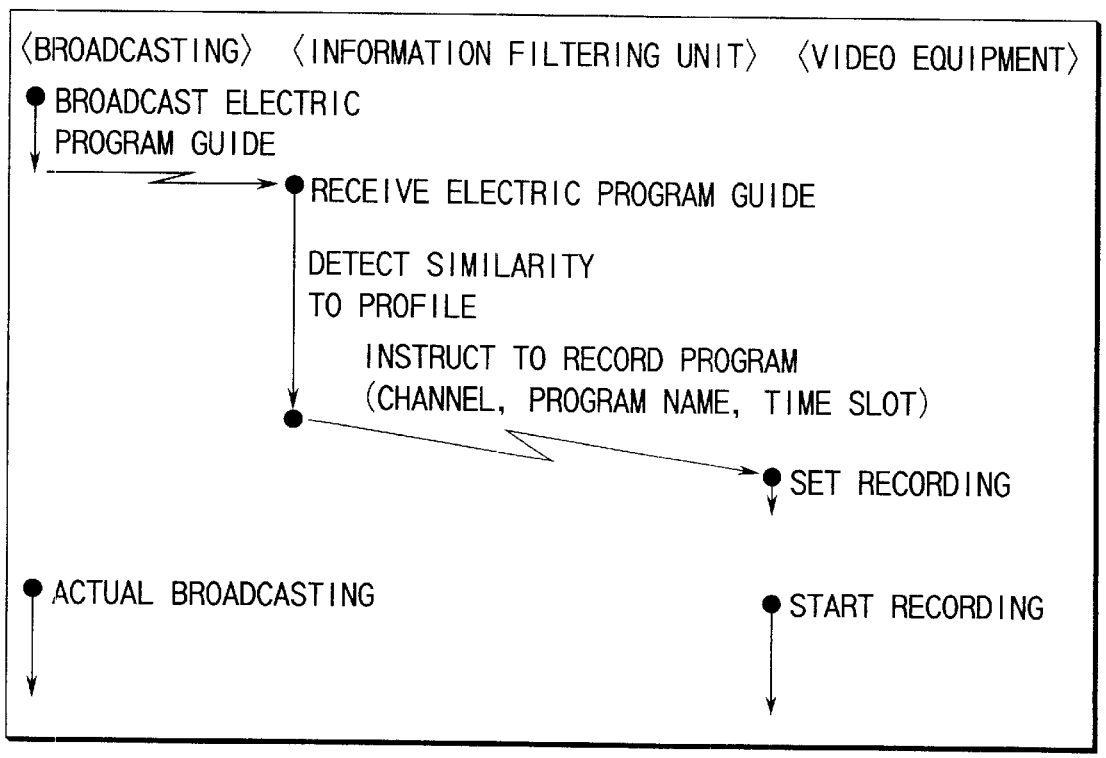
FIG. 18 shows a protocol for instructing prerecording based on the electric program guide in the first embodiment.
Figure 19A:
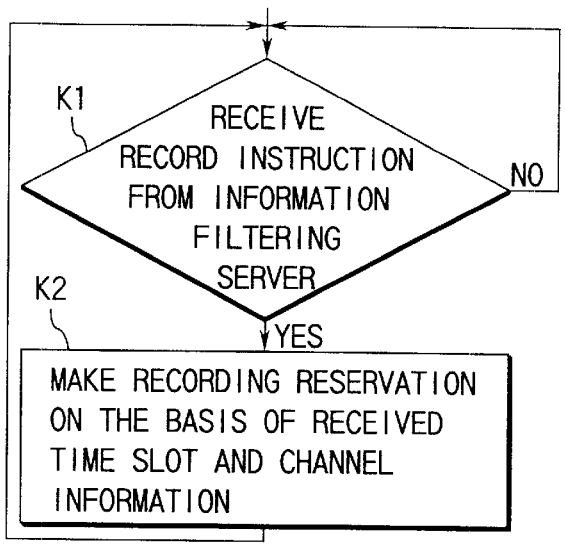
FIGS. 19A through 19E are flowcharts illustrating the process flow in the video equipment in the first embodiment.
Figure 19D:
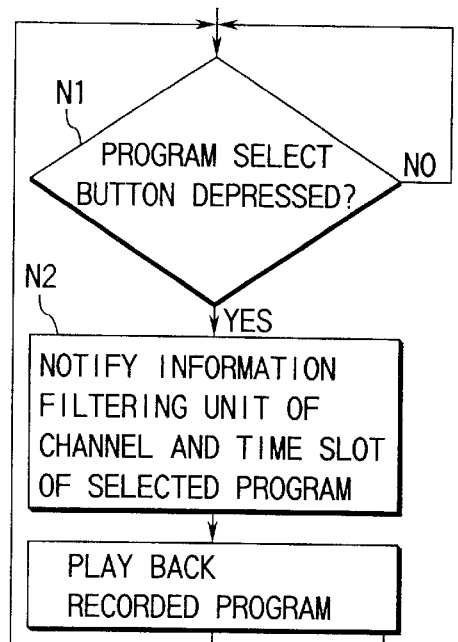
Figure 19B:
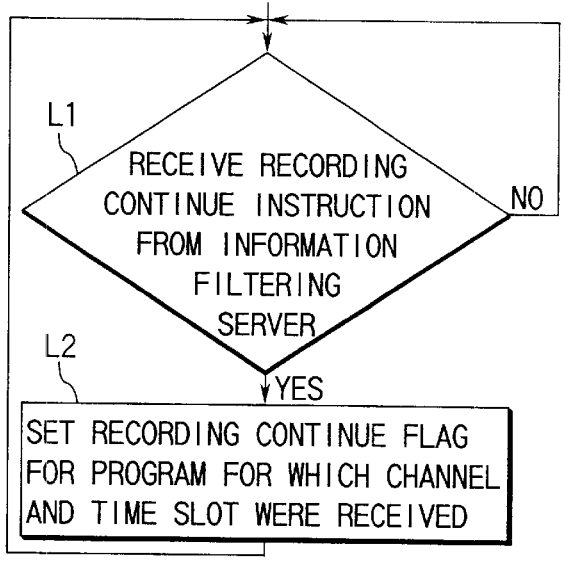
Figure 19E:
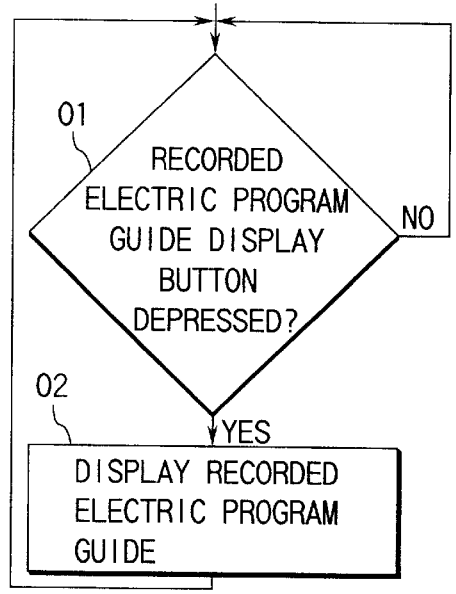
Figure 19C:
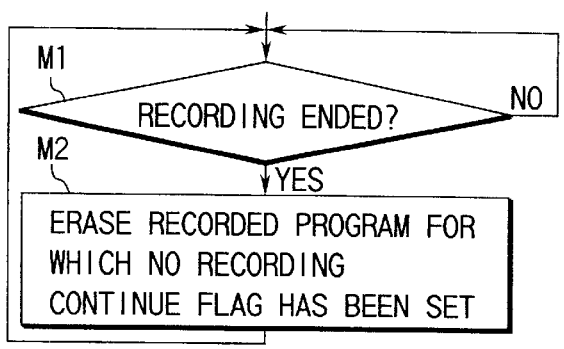

Here, the learning-related protocol for the video equipment 4 and the information filtering unit 2 is shown in FIG. 17, the electric program guide-based prerecording instruction-related protocol is shown in FIG. 18, and the process flow on the video equipment 4 side is shown in FIGS. 19A through 19E. That is, upon receipt of a record instruction from the information filtering server 2 in step K1 of FIG. 19A, the video equipment 4 makes a reservation for program recording on the basis of received time slot and channel information in step K2. Upon receipt of a recording continuation instruction from the information filtering server 2 in step L1 of FIG. 19B, the video equipment 4 sets a recording continuation flag for a program associated with the received channel and time slot in step L2. Further, in FIG. 19C, when determining from time information that the recording of the program ended (YES in step M1), the video equipment 4 erases the recorded program if the recording continuation flag has not been set for that program (step M2). Moreover, in FIG. 19D, the video equipment 4 makes a decision of whether its program select button (not shown) has been depressed or not in step N1. If YES, then the video equipment 4 notifies the information filtering unit 2 of the channel and time slot of the selected program in step N2. In subsequent step N3, the recorded program is played back. Furthermore, in FIG. 19E, the video equipment 4 makes a decision of whether its recorded electric program guide display button (not shown) has been depressed or not in step O1. If YES, then the recorded electric program guide is displayed in step O2.

Figures 20, 21:
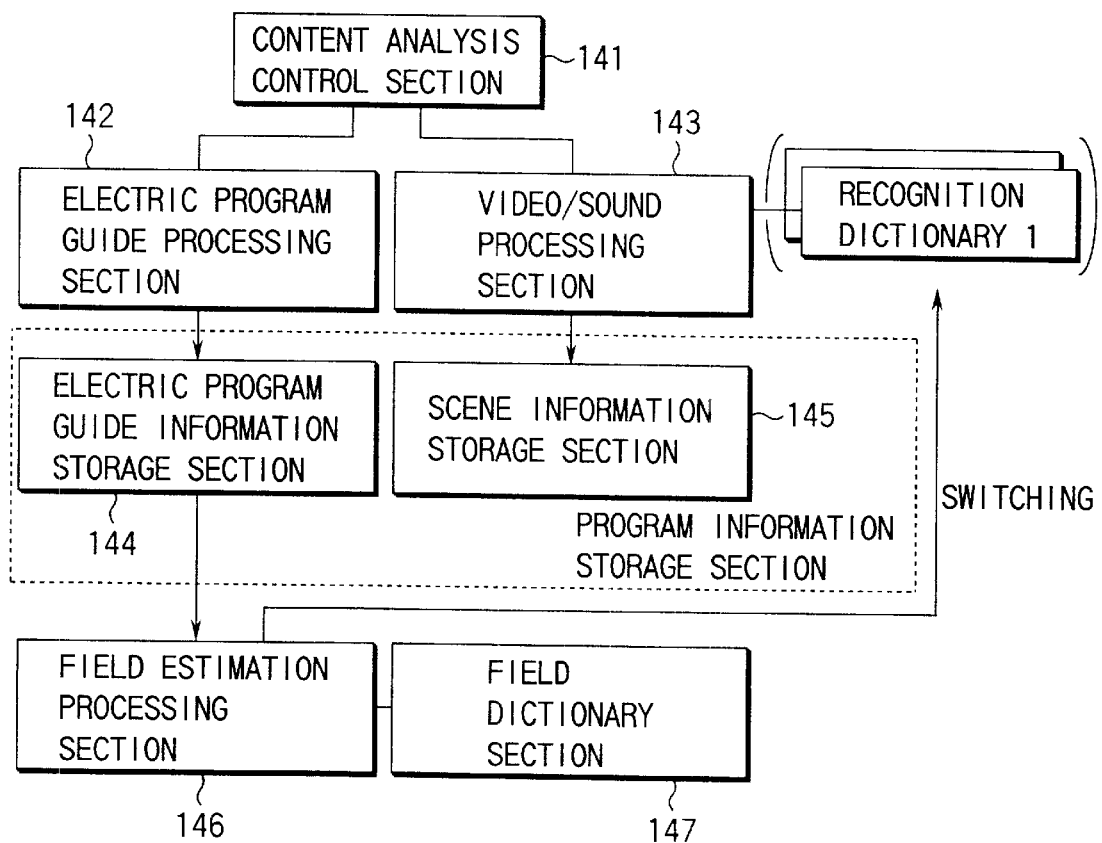
FIG. 20 shows a recording electric program guide displayed by the video equipment in the first embodiment.
FIG. 21 shows an arrangement of the content analysis section according to a second embodiment of the present invention.

The video equipment 4 displays the list of recorded programs in such a form as shown in FIG. 20. To display the recorded electric program guide, the video equipment 4 is allowed to have its own display such as a liquid crystal display. Alternatively, the list may be displayed on the screen of a TV receiver. When the user makes a selection from the recorded electric program guide, the video equipment 4 plays back a program selected and notifies the information filtering unit that the program was selected.

The first embodiment has been described as making program preselection based on the electric program guide on the information filtering unit 2 side. The electric program guide-based program selection, which is text processing, requires no computing power, unlike video analysis processing and speech recognition processing. It is therefore possible to modify the system in such a way as to make the electric program guide-based program selection on the video equipment 4 side and to perform the video analysis processing and the speech recognition processing on the information filtering unit 2 side.

Next, a second embodiment of the present invention will be described. An arrangement of the content analysis section 14 in the second embodiment is shown in FIG. 21.

The second embodiment is based on the fact that the accuracy of the video analysis and speech recognition processing can be increased by restricting their field of application. For, example, if vocabularies to be recognized in speech recognition can be limited, then the recognition accuracy will be improved remarkably in comparison with the case where no limitation is imposed on the vocabulary. The field of programs is identified in advance through an electric program guide and dictionaries used in video analysis and speech recognition are switched accordingly. To this end, the second embodiment is equipped with a field estimation processing section 146 and a field dictionary 147.

The field estimation processing section 146 stores into the field dictionary 147 words and phrases frequently used in each field (for example, in the field of baseball, team names such as GIANTS and so on) in such a manner that they are associated with the field and identifies the field by checking keywords resulting from electric program guide processing against keywords stored in the field dictionary 147.

In news programs, a wide variety of fields are dealt with. In such a case, the processing system can be switched into video processing to recognize telops that appear at the bottom of the TV screen. Further, in music programs, switching can be made into recognition processing of recognizing music. Whether music is being made can be recognized through analysis of whether or not sound outside the human voice frequencies is present or whether or not sound is periodical. If music portions can be taken out, a summary of a music program can be created.

A third embodiment of the present invention will be described next.

In the third embodiment, the information filtering unit 2 performs video summarization processing and sends only the structured information (i.e., time slot information corresponding to extracted scenes) to the video terminal. The video equipment displays a video summary on the basis of a broadcast received and structured information received from the information filtering unit. The third embodiment supposes that a program is broadcast many times but not once.

Figure 22:
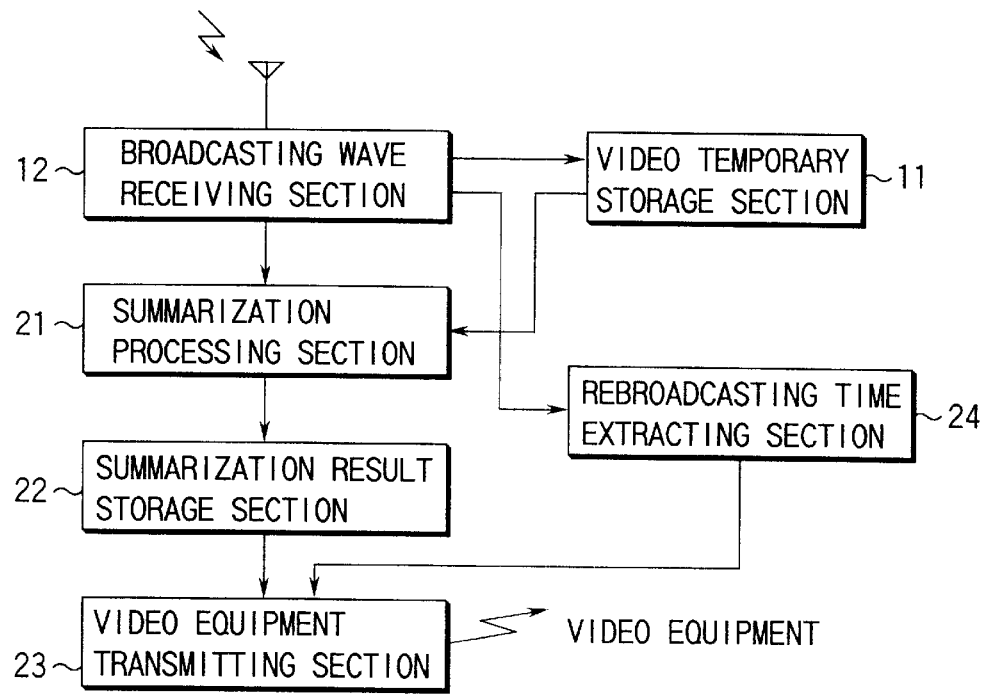
FIG. 22 shows a functional block diagram of the information filtering unit according to a third embodiment of the present invention.

FIG. 22 is a functional block diagram of the information filtering unit 2, which comprises a broadcasting wave receiving section 12 which receives a broadcast program and stores it into a video temporary storage section 11, a summarization processing section 21 which makes differentials between video stored in the video temporary storage section 11 and video received from the broadcasting wave receiving section 12 and summarizes the broadcast program, a summarization result storage section 22 which stores which time slot each scene retrieved for summarization is in, a transmitting section 23 which transmits the results of the summarization to the video equipment 4, and a rebroadcast time slot extracting section 24 which detects the rebroadcasting time slot from the electric program guide received from the broadcasting station 1 (i.e., reads information indicating a rebroadcast from the electric program guide and extracts the rebroadcasting time slot for the corresponding program).

The summarization processing itself is not the object of the present invention. A technique of detecting cuts in video is known; thus, the summarization can be performed by making the interval between each cut a scene and cutting out a fixed length of video from the middle of each scene. Alternatively, a video summary can be created through the use of a technique as shown in "Informedia; CMU Digital Video Library Project" by Kanade and Sato, Information Processing, Vol. 37, No. 9, pp. 841–847 (1996).

Figure 23:
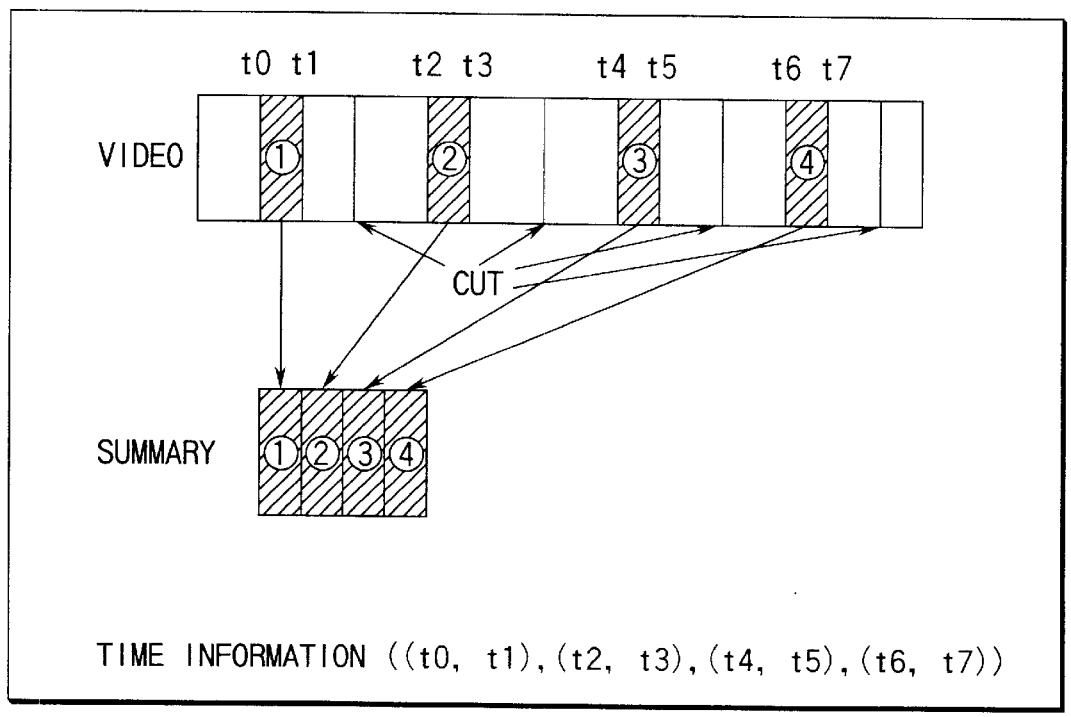
FIG. 23 is a conceptual diagram of a video summary of a certain program in the third embodiment.
Figure 24:
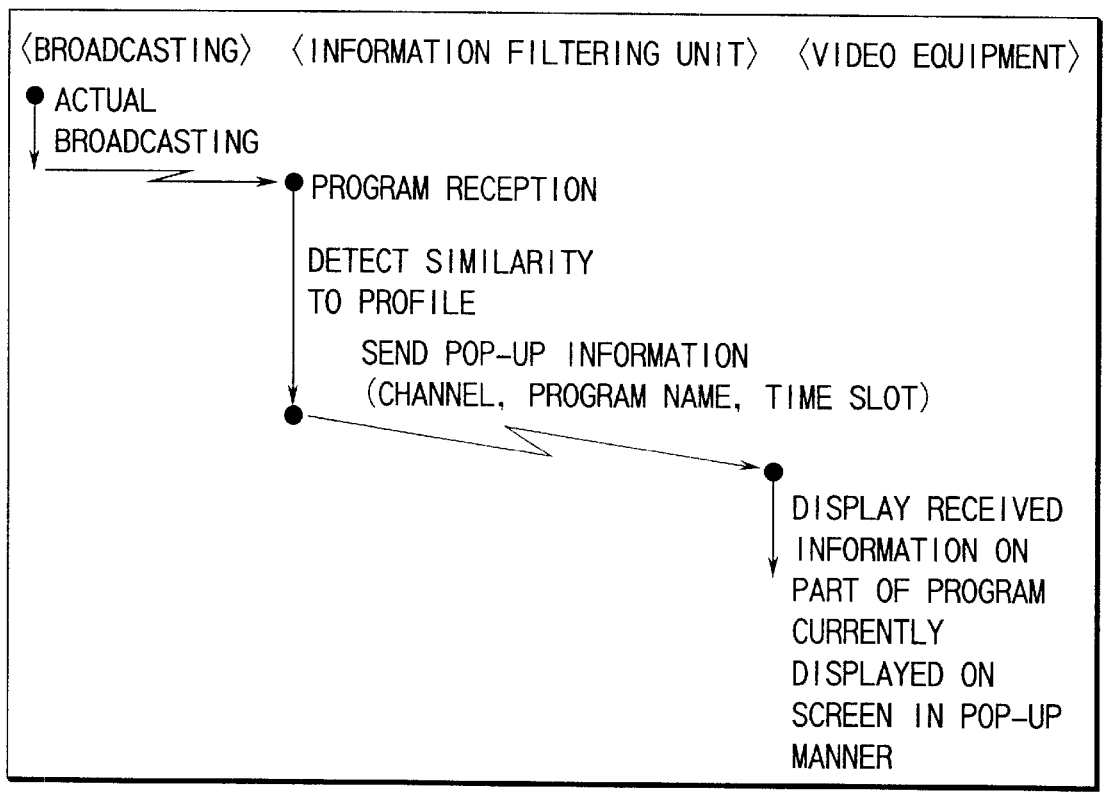
FIG. 24 is a conceptual diagram illustrating a modified version of the present invention.

The summarization result storage section 22 stores the summary as time slot information, the conceptual diagram of which is shown in FIG. 23. More specifically, FIG. 23 is a conceptual diagram in creating a video summary from a certain program. Assume here that cuts are detected from the entire video of that program and pieces of video, 1, 2, 3, 4, in the middle positions of the respective scenes are taken out as a summary. The time of each piece of video is from t0 to t1 for video 1, from t2 to t3 for video 2, from t4 to t5 for video 3, and from t6 to t7 for video 4. In this case, as a summary of the program, time information [(t0, t1), (t2, t3), (t4, t5), (t6, t7)] is stored in the summary storage section 22.

The transmitting section 23 transmits to the video equipment 4 the resulting summary (i.e., (t0, t1), (t2, t3), (t4, t5), (t6, t7) shown in FIG. 23) together with title and channel information of the program. At this point, the rebroadcast time slot detected in the rebroadcast time extracting section 24 is also transmitted. The rebroadcast time detecting section 24 can be implemented by means of simple processes of analyzing the electric program guide sent from the broadcasting station and extracting a program of the same channel and title.

On the other hand, in order for the video equipment 4 to create a summary when the same program is rebroadcast, the video equipment 4 simply records that program on the basis of time slot information sent from the information filtering unit 2.

Important portions, namely, portions adopted as a summary may vary between video and sound. For this reason, time information of summarized portions may be stored independently for each of video and sound.

The system of the second embodiment is arranged such that the information filtering unit 2 analyzes programs received from the broadcasting station 1, collates the programs with the user profile, and instructs the video equipment 4 to record a certain program for which a given threshold is exceeded and, in response to this, the video equipment 4 makes a reservation for recording. The system may be modified in such a way that the information filtering unit 2 notifies the video equipment 4 of program information sent from the broadcasting station 1 and the video equipment 4 displays the information on a currently displayed program in a pop-up manner.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information filtering system, comprising: an information filtering unit comprising:

receiving means for receiving programs broadcast by a broadcasting station;

filtering means for carrying out rough filtering with respect to the received programs based on an electric program guide broadcast by the broadcasting station, and for instructing video equipment about a wide range of programs;

analyzing means for analyzing the contents of the programs received by the receiving means;

selecting means for, by collating the analyses of the analyzing means with a stored profile including personal programming tastes of a user, selecting a program that matches the profile;

means for sending an instruction to continue program recording to the video equipment in response to the results of selection by the selecting means; and means for sending an advance instruction for program recording to the video equipment in response to an electric program guide broadcast by the broadcasting station; and the video equipment for automatically recording a program from the broadcasting station which is selected by the selecting means in the information filtering unit, in response to the instruction to continue program recording, and for erasing the program when the instruction to continue program recording is not sent.

2. The system according to claim 1, wherein the video equipment comprises means for storing the personal programming tastes of the user into the information filtering unit as the profile.

3. The system according to claim 1, wherein the video equipment comprises means for storing information concerning programs the user actually viewed into the information filtering unit as the profile.

4. The system according to claim 1, wherein the analyzing means comprises:

electric program guide processing means responsive to an electric program guide broadcast by the broadcasting station for retrieving from the electric program guide a combination of a keyword associated with each program and a time slot in which the program is to be broadcast;

video sound processing means for cutting out scenes making up a program from video and sound information, extracting a keyword contained in each scene through speech recognition, and extracting a combination of a keyword and the time slot in which the corresponding scene is broadcast;

program information storage means for storing the combination of a keyword associated with each program and the time slot in which the program is to be broadcast, extracted by the electric program guide processing means, and the combination of a keyword and the time slot in which the corresponding scene is broadcast, extracted by the video sound processing means; and analysis control means for activating the electric program guide processing means when the electric program guide is broadcast and activating the video sound processing means at a start of the program.

5. The system according to claim 4, wherein the electric program guide processing means comprises:

means for dividing program information broadcast by the broadcasting station into program units;

means for making a morphemic analysis of a program name of a program unit to extract words;

means for extracting a keyword from the extracted words;

means for storing a combination of the extracted keyword and time slot information into the program information storage means; and means for computing a similarity between the keyword stored in the program information storage means and the profile and, when the resulting similarity exceeds a given threshold, outputting the corresponding program name to the sending means.

6. The system according to claim 4, wherein the video sound processing means comprises:
   means for cutting out scenes from a program;
   means for recognizing speech contained in each of the cutout scenes;
   means for extracting a keyword from the results of the speech recognition; and
   means for storing the keyword extracted into program information storage means.

7. The system according to claim 4, wherein the program information storage means has a scene information storage section for storing channel information, the time slot in which a program is broadcast, time slots in which scenes of the program are broadcast, and keywords for each scene.

8. The system according to claim 3, further comprising learning processing means, responsive to viewing information sent from the video equipment, for extracting a keyword associated with each program selected by the user and adding keywords not contained in the profile.

9. The system according to claim 1, wherein the sending means comprises means for detecting a similarity to the profile based on the electric program guide broadcast from the broadcasting station, instructing the video equipment to record a program having the similarity, analyzing programs from the broadcasting station, and instructing the video equipment to continue recording a program matching the personal programming tastes of the user.

10. The system according to claim 4, further comprising:
    a field dictionary for storing keywords by program field;
    a plurality of recognition dictionaries for use in video processing and speech recognition; and
    field estimation processing means for identifying a field of a program by checking a keyword obtained by the electric program guide processing means with the keywords in the field dictionary, and switching the plurality of recognition dictionaries accordingly.

11. An information filtering system comprising:
    an information filtering unit comprising:
    receiving means for receiving programs broadcast by a broadcasting station;
    filtering means for carrying out rough filtering with respect to the received programs based on an electric program guide broadcast by the broadcasting station, and for instructing video equipment about a wide range of programs;
    analyzing means for analyzing contents of the program;
    output means for outputting a summary of a program received by the receiving means and time information associated with the summary;
    rebroadcasting time detecting means for detecting a program rebroadcasting time from the electric program guide broadcast by the broadcasting station; and
    sending means for sending to video equipment the summary and associated time information output from the output means and the rebroadcasting time detected by the rebroadcasting time detecting means, the sending means comprising:
        means for sending an instruction to continue program recording to the video equipment; and
        means for sending an advance instruction for program recording to the video equipment in response to the electric program guide broadcast by the broadcasting station; and
    the video equipment, responsive to the summary and associated time information and rebroadcasting time sent from the sending means, for displaying the summary, for automatically recording a program in response to the instruction to continue program recording, and for erasing a program when the instruction to continue program recording is not sent by the sending means.

12. An information filtering unit, comprising:
    receiving means for receiving programs broadcast by a broadcasting station;
    filtering means for carrying out rough filtering with respect to the received programs based on an electric program guide, and for instructing video equipment about a wide range of programs;
    analyzing means for analyzing the contents of the programs received by the receiving means;
    selecting means for, by checking the analyses of the analyzing means with a stored profile including personal programming tastes of a user, selecting a program that matches the profile;
    means for sending an instruction to continue program recording to the video equipment in response to the results of selection by the selecting means; and
    means for sending an advance instruction for program recording to the video equipment in response to an electric program guide broadcast by the broadcasting station.

13. The unit according to claim 12, wherein the analyzing means comprises:
    electric program guide processing means, responsive to an electric program guide broadcast by the broadcasting station, for retrieving from the electric program guide a combination of a keyword associated with each program and a time slot in which the program is to be broadcast;
    video sound processing means for cutting out scenes making up a program from video and sound information, extracting a keyword contained in each scene through speech recognition, and extracting a combination of a keyword and the time slot in which the corresponding scene is broadcast;
    program information storage means for storing the combination of a keyword associated with each program and the time slot in which the program is to be broadcast, extracted by the electric program guide processing means, and the combination of a keyword and the time slot in which the corresponding scene is broadcast, extracted by the video sound processing means; and
    analysis control means for activating the electric program guide processing means when the electric program guide is broadcast and activating the video sound processing means at a start of the program.

14. The unit according to claim 13, wherein the electric program guide processing means comprises:
    means for dividing program information broadcast by the broadcasting station into program units;
    means for making a morphemic analysis of a program name of a program unit to extract words;
    means for extracting a keyword from the extracted words;
    means for storing a combination of the extracted keyword and time slot information into the program information storage means; and
    means for computing a similarity between the keyword stored in the program information storage means and the profile and, when the resulting similarity exceeds a given threshold, outputting the corresponding program name to the sending means.

15. The unit according to claim 13, wherein the video sound processing means comprises:
- means for cutting out scenes from a program;
- means for recognizing speech contained in each of the cutout scenes;
- means for extracting a keyword from results of the speech recognition; and
- means for storing the keyword extracted into the program information storage means.

16. The unit according to claim 13, wherein the program information storage means comprises a scene information storage section for storing channel information, the time slot in which a program is broadcast, time slots in which scenes of the program are broadcast, and keywords for each scene.

17. The unit according to claim 12, wherein the sending means comprises means, responsive to the results of selection by the selecting means for sending an instruction to continue program recording to the video equipment; and means, responsive to an electric program guide broadcast by the broadcasting station, for sending an advance instruction for program recording to the video equipment.

18. The unit according to claim 12, wherein the sending means comprises means for detecting a similarity with the profile on the basis of an electric program guide broadcast from the broadcasting station, instructing the video equipment to record a program having the similarity, analyzing programs from the broadcasting station, and instructing the video equipment to continue recording a program matching the personal programming tastes of the user.

19. The unit according to claim 13, further comprising:
- a field dictionary for storing keywords by program field;
- a plurality of recognition dictionaries for use in video processing and speech recognition; and
- field estimation processing means for identifying a field of a program by checking a keyword obtained by the electric program guide processing means with the keywords in the field dictionary and switching the recognition dictionaries accordingly.

20. An information filtering unit, comprising:
- receiving means for receiving programs broadcast by a broadcasting station,
- filtering means for carrying out rough filtering with respect to the received programs based on an electric program guide, and for instructing video equipment about a wide range of programs;
- output means for outputting a summary of a program received by the receiving means and time information associated with the summary; and
- rebroadcasting time detecting means for detecting a program rebroadcasting time from an electric program guide broadcast by the broadcasting station.

21. An information filtering method for use with an information filtering unit, connected with television broadcast viewing video equipment by a communications line, for selecting a program from a number of programs comprising the steps of:
- filtering means for carrying out rough filtering with respect to a received program based on an electric program guide, and for instructing video equipment to a wide range of programs;
- analyzing the contents of programs in terms of at least one of video, sound, and text, and extracting associated attributes;
- checking the extracted attributes against a stored profile including personal programming tastes of a user in advance to select a program that matches the profile;
- sending an instruction to continue program recording to the video equipment; and
- sending an advance instruction for program recording to the video equipment in response to an electric program guide broadcast by the broadcasting station.

22. An information filtering method for use with an information filtering unit, connected with video equipment for viewing television broadcasts by a communications line, for selecting a program from a number of programs, comprising:
- carrying out rough filtering with respect to a received program based on an electric program guide, and for instructing video equipment to a wide range of programs;
- creating a summary of a program; and
- transmitting the created summary representing time information within the program to the video equipment.

* * * * *